US007883421B2

(12) United States Patent
Moore et al.

(10) Patent No.: US 7,883,421 B2
(45) Date of Patent: Feb. 8, 2011

(54) GAMING APPARATUS HAVING A DISPLAY WITH A CONDUCTIVE COATING

(75) Inventors: Steven W. Moore, Truckee, CA (US); Ron D. Dulco, Carson City, NV (US); Paul Fiorillo, Reno, NV (US); Cynthia Criss-Puszkiewicz, Reno, NV (US)

(73) Assignee: IGT, Reno, NV (US)

(*) Notice: Subject to any disclaimer, the term of this patent is extended or adjusted under 35 U.S.C. 154(b) by 950 days.

(21) Appl. No.: 10/390,454

(22) Filed: Mar. 17, 2003

(65) Prior Publication Data

US 2004/0185938 A1 Sep. 23, 2004

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |
| ***B05D 5/12*** | (2006.01) |

(52) U.S. Cl. ............................ 463/46; 463/37; 463/42; 427/96.3

(58) Field of Classification Search .................. 463/20, 463/30, 46, 37, 42; 427/96.3

See application file for complete search history.

(56) References Cited

U.S. PATENT DOCUMENTS

| | | | | |
|---|---|---|---|---|
| 4,109,911 | A | 8/1978 | Van Auken | 273/31 |
| 4,246,613 | A | 1/1981 | Choder et al. | 358/245 |
| 5,796,389 | A | 8/1998 | Bertram et al. | 345/173 |
| 6,087,012 | A | 7/2000 | Varaprasad et al. | 428/428 |
| 6,180,030 | B1 | 1/2001 | Hirai et al. | 252/512 |
| 6,181,394 | B1 | 1/2001 | Sanelle et al. | 349/96 |
| 6,391,400 | B1 | 5/2002 | Russell et al. | 428/34 |
| 6,420,963 | B1 | 7/2002 | Rossetti et al. | 340/310.01 |
| 6,476,798 | B1 | 11/2002 | Bertram et al. | 345/174 |
| 6,483,719 | B1 | 11/2002 | Bachman | 361/816 |

(Continued)

FOREIGN PATENT DOCUMENTS

EP 0 352 425 A1 1/1990

(Continued)

OTHER PUBLICATIONS

International Search Report for Application No. PCT/US2004/007859 dated Aug. 25, 2004.

*Primary Examiner*—John M Hotaling, II
*Assistant Examiner*—Adetokunbo Torimiro
(74) *Attorney, Agent, or Firm*—Weaver Austin Villeneuve & Sampson LLP

(57) ABSTRACT

A gaming apparatus comprising a housing, a transparent panel with a first and second surface, and a conductive coating disposed proximate to the second surface, wherein the coating has a high visible light transmittance and a low electrical surface resistance. The gaming apparatus also comprises a grounded metallic strip coupled to the coating and located at a perimeter of the coating, a value input device, and a mechanically rotatable reel that is disposed in the housing so that the mechanically rotatable reel is visible to a player of the gaming apparatus through the transparent panel and the coating. Also included is a controller that comprises a processor and a memory coupled to the processor. The controller is programmed to allow a person to make a wager and to determine a value payout associated with an outcome of a game incorporating the mechanically rotatable reel.

20 Claims, 17 Drawing Sheets

U.S. PATENT DOCUMENTS 6,575,541 B1 6/2003 Hedrick et al. ........... 312/223.1
6,583,935 B1 6/2003 Saif et al. ................... 359/582
2001/0013681 A1* 8/2001 Bruzzese et al. ........ 273/143 A
2001/0031658 A1 10/2001 Ozaki et al. ................... 463/16
2002/0046851 A1* 4/2002 Marutsuka ............. 174/35 MS
2003/0156080 A1* 8/2003 Koike et al. ................... 345/60
2004/0265602 A1* 12/2004 Kobayashi et al. .......... 428/458

FOREIGN PATENT DOCUMENTS

EP 0 502 364 A1 9/1992
EP 0 652 461 A1 5/1995
EP 0 902 614 A2 3/1999

* cited by examiner

FIG. 18
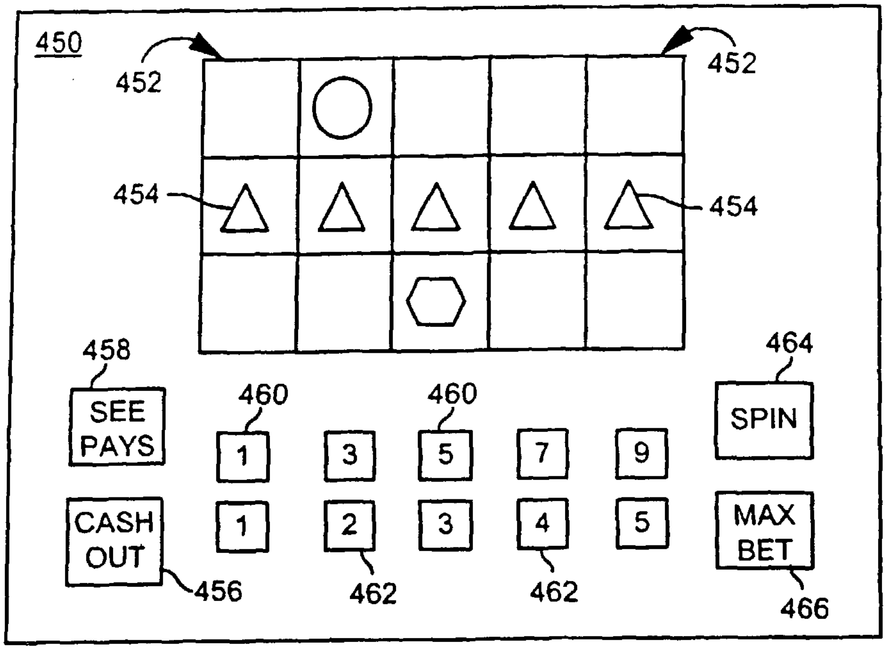
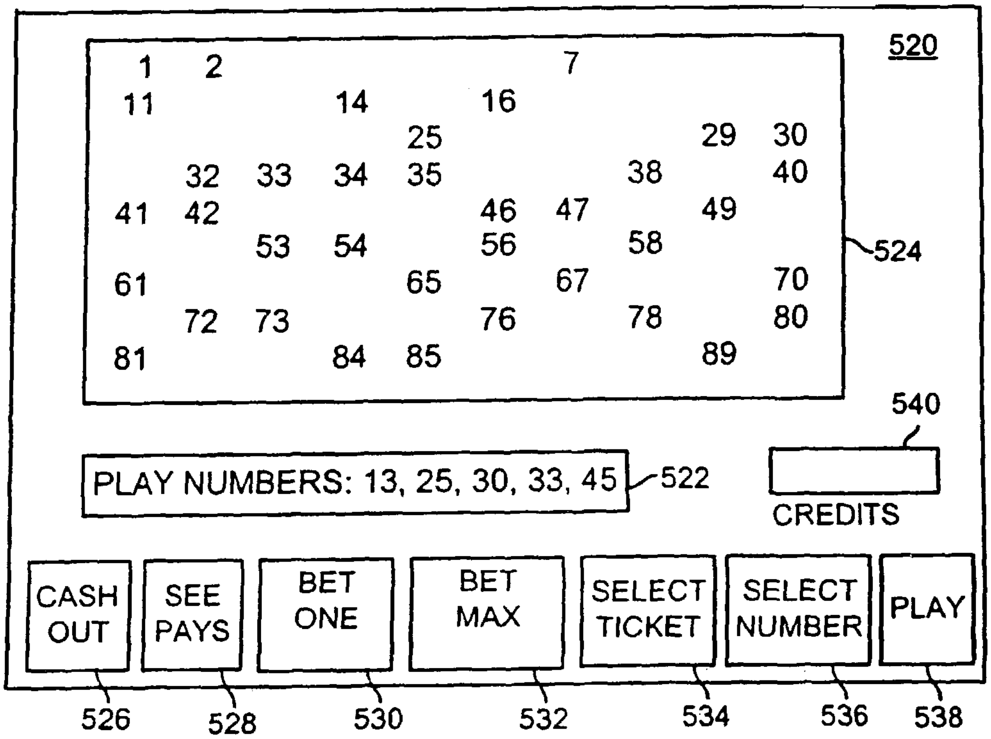
FIG. 19

GAMING APPARATUS HAVING A DISPLAY WITH A CONDUCTIVE COATING

BACKGROUND

Conventional gaming apparatuses are susceptible to electromagnetic fields in the environment. Electromagnetic Compatibility (EMC) is the ability of an apparatus, device, unit, or system to function satisfactorily in its electromagnetic environment without reacting to electromagnetic disturbances in that environment. This encompasses both immunity to outside noise which allows the apparatus to function satisfactorily, and emission of noise which limits the introduction of intolerable disturbances.

Radiated emissions deals with the electromagnetic fields emitted by any electronic circuit that performs a switching sequence, and the emissions radiated increase if an antenna, which could be an I/O cable for example, is present. Conducted emissions refer to the noise that is generated into the power lines for the apparatus which causes interference at certain frequencies. Electrostatic discharge (ESD) is the static charge that can build up in normal operations to a level of several kilovolts which can stress and damage electronic components within the gaming apparatuses. Radio Frequency Immunity (RFI) is the ability of the gaming apparatuses to work undisturbed in an RF field (electromagnetic field).

Gaming regulatory agencies test for these various apparatus emissions and their immunity to electromagnetic fields. Certain jurisdictions have particularly rigorous tests that provide challenges in passing for gaming apparatus manufacturers. Conventional gaming apparatuses typically use metal housings to provide structural support as well as taking advantage of its shielding capabilities. However, portions of the housing or even panels in the gaming apparatuses' housing are made of plastic or glass materials that have poor shielding characteristics.

One area that has been found to be a large "hole" for emissions to penetrate the gaming apparatuses is the glass area of the apparatuses' housings. One attempt to reduce the emissions in the glass panels was in a number of prior art pinball machines manufactured and sold by IGT of Reno, Nev. more than one year prior to the filing of this patent that utilized a conductive coating of Indium Tin Oxide applied to a clear film that was placed next to the glass panel and inside the pinball machines. The use of the Indium Tin Oxide on the clear film did not provide satisfactory results in its ability to eliminate or sufficiently reduce the emissions through the glass panel of the pinball machine.

SUMMARY OF THE INVENTION

In one aspect of the invention, a gaming apparatus is provided having a housing and a transparent panel associated with the housing, wherein the display panel comprises a first surface and a second surface. The gaming apparatus also includes a conductive coating disposed proximate to the second surface, the coating having a visible light transmittance of greater than 75% and a surface resistance less than three hundred ohms per square. Also included is a metallic strip coupled to the coating and located at a perimeter of the coating, the metallic strip being electrically grounded, a value input device, and a mechanically rotatable reel disposed in the housing so that the mechanically rotatable reel is visible to a player of the gaming apparatus through the transparent panel and the coating.

The gaming apparatus also includes a controller operatively coupled to the mechanically rotatable reel and the value input device, the controller comprising a processor and a memory operatively coupled to the processor. The controller is programmed to allow a person to make a wager and determine a value payout associated with an outcome of a game incorporating the mechanically rotatable reel.

In another aspect of the invention, a gaming apparatus is provided that includes a housing, a transparent panel associated with the housing, and a conductive coating applied to the transparent panel, the coating having a visible light transmittance of greater than 75% and a surface resistance less than three hundred ohms per square. Also included is a metallic strip coupled to the coating and located at a perimeter of the coating, the metallic strip being electrically grounded, a value input device, and a mechanically rotatable member disposed in the housing so that the mechanically rotatable member is visible to a player of the gaming apparatus through the transparent panel and the coating.

The gaming apparatus also includes a controller operatively coupled to the mechanically rotatable member and the value input device, the controller comprising a processor and a memory operatively coupled to the processor. The controller is programmed to allow a person to make a wager and determine a value payout associated with an outcome of a game incorporating the mechanically rotatable member. The mechanically rotatable member may be a slot reel or any other type of wheel.

In yet another aspect of the invention, a gaming apparatus is provided that includes a housing, a conductive coating applied to at least a portion of the housing, the coating having a surface resistance less than three hundred ohms per square and a shielding effectiveness greater than 20 dB. The gaming apparatus further includes a metallic connector coupled to the coating, the metallic connector being electrically grounded and a value input device.

The gaming apparatus also includes a controller disposed in the housing and operatively coupled to the value input device, the controller comprising a processor and a memory operatively coupled to the processor. The controller is programmed to allow a person to make a wager and determine a value payout associated with an outcome of a casino game, the casino game selected from the group of casino games consisting of poker, blackjack, slots, keno, and bingo.

Additional aspects of the invention are defined by the claims of this patent.

BRIEF DESCRIPTION OF THE DRAWINGS

FIG. 18 is an illustration of an embodiment of a visual display that may be displayed during performance of the slots routine of FIG. 20;

FIG. 19 is an illustration of an embodiment of a visual display that may be displayed during performance of the video keno routine of FIG. 21;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
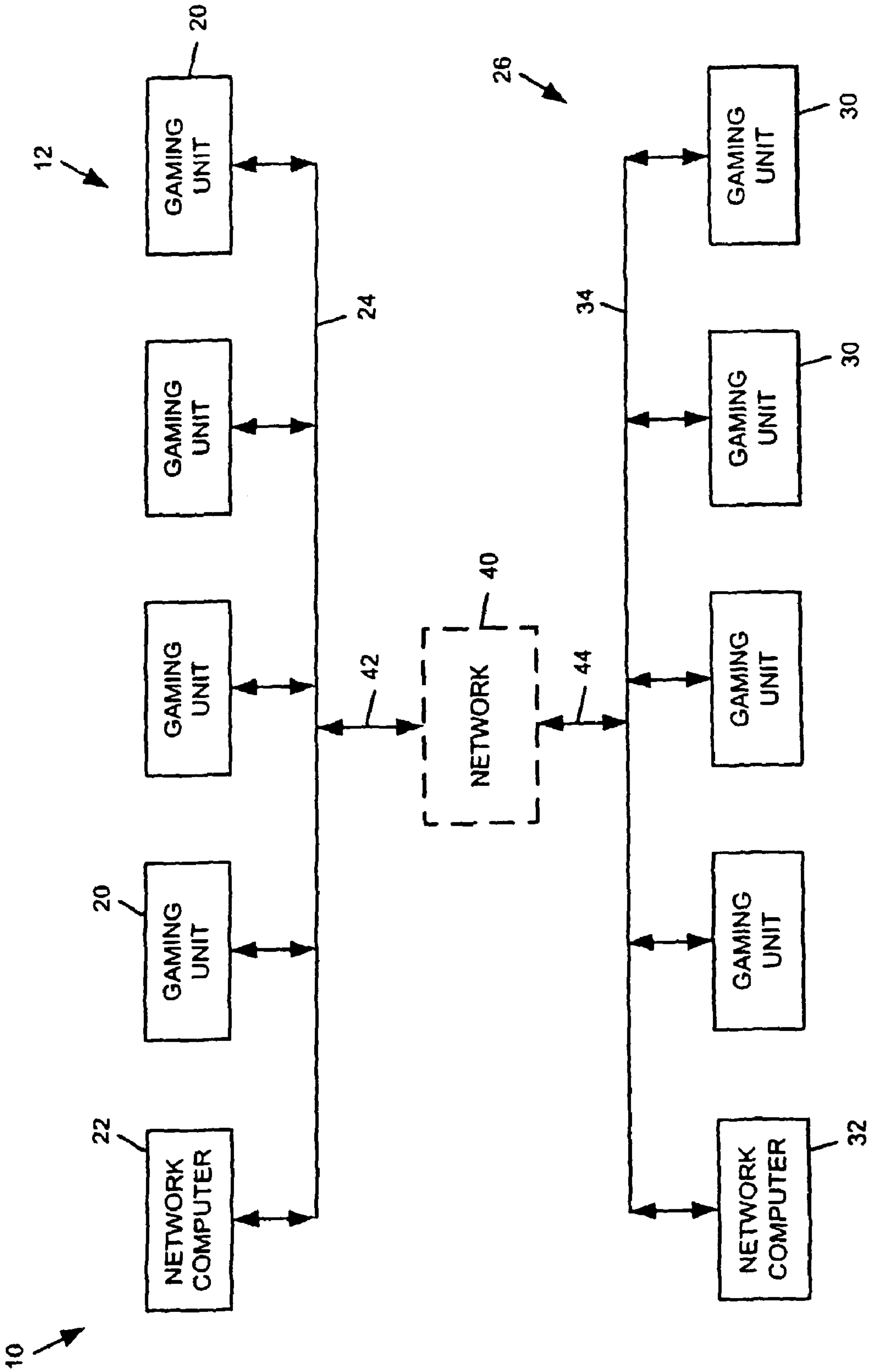
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
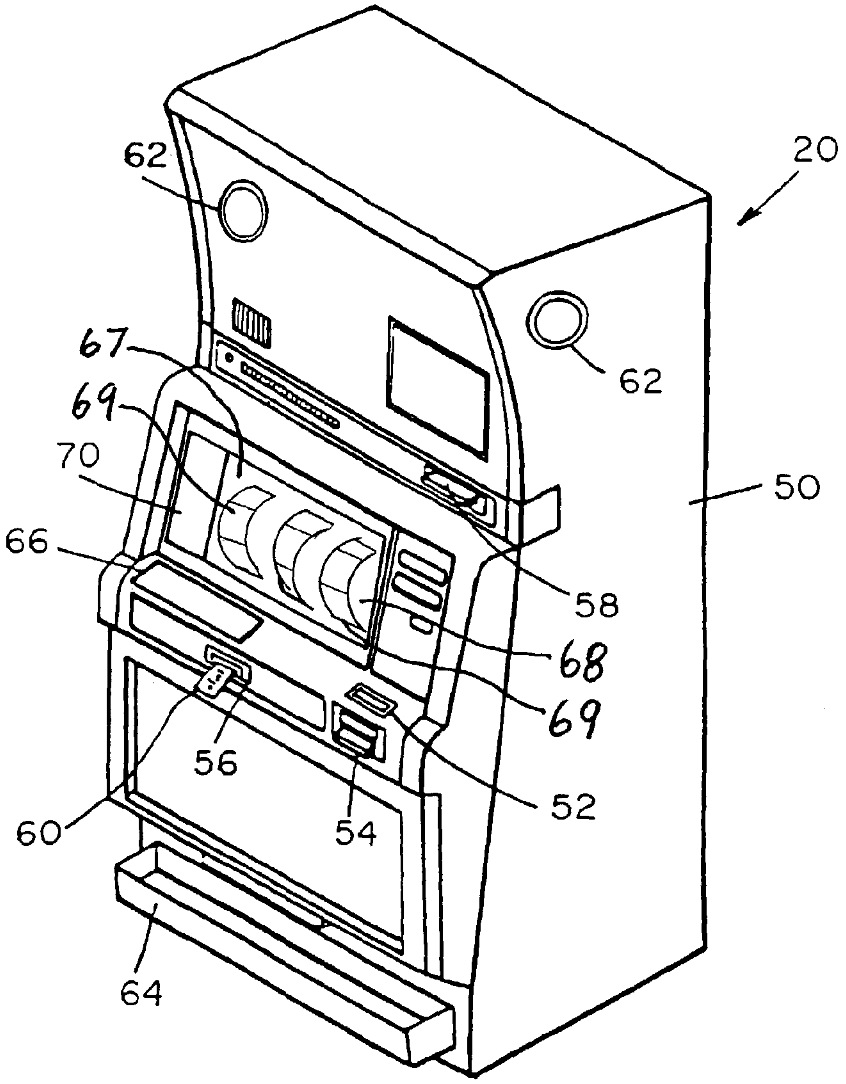
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, and an input control panel 66. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc. The housing 50 may have a transparent panel 67 associated therewith, wherein the display panel 67 has a conductive coating 68 disposed proximate to the inside surface of the display panel 67. A plurality of mechanically rotatable reels 69 may be disposed within the housing 50 and behind the display panel 67. The mechanically rotatable slot reels 69 may be positioned within the housing 50 so that a surface of the slot reels 69 and a plurality of different reel symbols disposed thereon are visible to a player through the transparent panel 67 and the conductive coating 68. While FIG. 2 illustrates three mechanically rotatable slot reels in the housing 50, it should be noted that any number of mechanically rotatable reels may be used. It should also be noted that the mechanically rotatable slot reels 69 may be part of a primary game played on the gaming apparatus 20 or they may be used as a special bonus game for more standard casino games.

Instead of the reels 69, or in addition to the reels 69, the gaming apparatus 20 may also include a color video display unit 70 for displaying images relating to the game or games provided by the gaming apparatus 20. The video display unit 70 may also have a coating located on the inside of the housing 50, similar to the conductive coating 68 on the transparent panel 67. It should be noted that the video display unit 70 may be located elsewhere on the gaming unit 20 or eliminated completely. Similarly, the mechanical reels 69 may be located elsewhere on the gaming unit 20. For example, the video display unit 70 may be enlarged to occupy the portion with the mechanical reels 69 on FIG. 2, and one or more mechanical wheels (not shown) may be mounted on top of the gaming unit for use in a bonus game. Furthermore, if the mechanical wheel is located on top of the gaming unit 20, it may be encased behind a transparent panel and a conductive coating similar to the transparent panel 67 and the conductive coating 68.

Figure 2A:
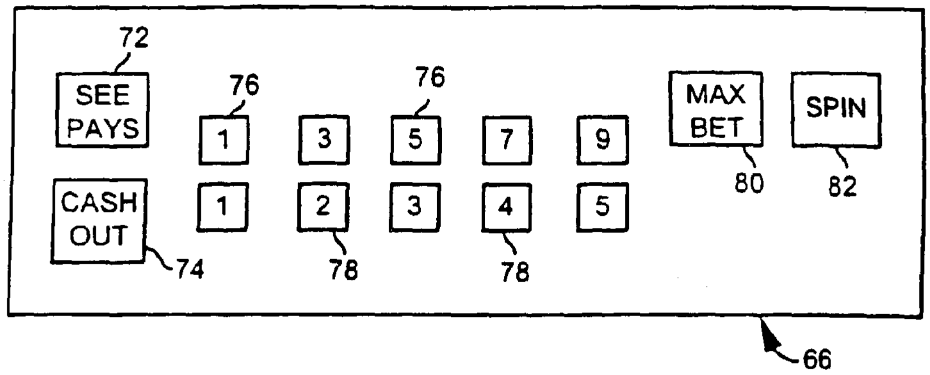
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
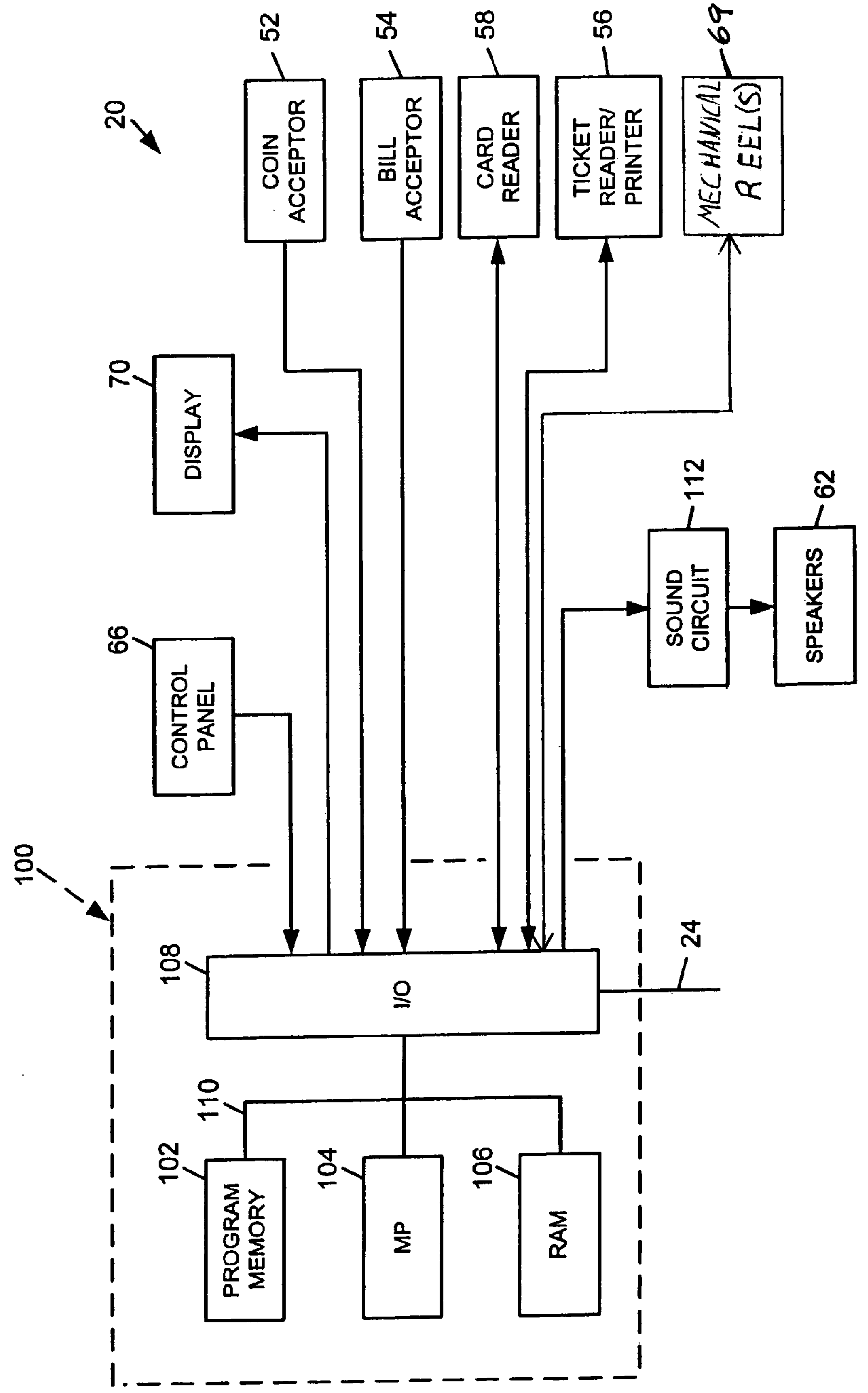
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the display 70, the coin acceptor 52, the bill acceptor 54, the card reader 58, the ticket reader/printer 56 and the mechanical reels 69 may be operatively coupled to the I/O circuit 108, each of those components being so coupled by either a unidirectional or bidirectional, single-line or multiple-line data link, which may depend on the design of the component that is used. Any type of driver, control circuits, and/or motors (not shown) may be operatively coupled between the reels 69 and the I/O circuit 108. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 69, 70, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Gaming Unit Conductive Coatings

Figure 4:
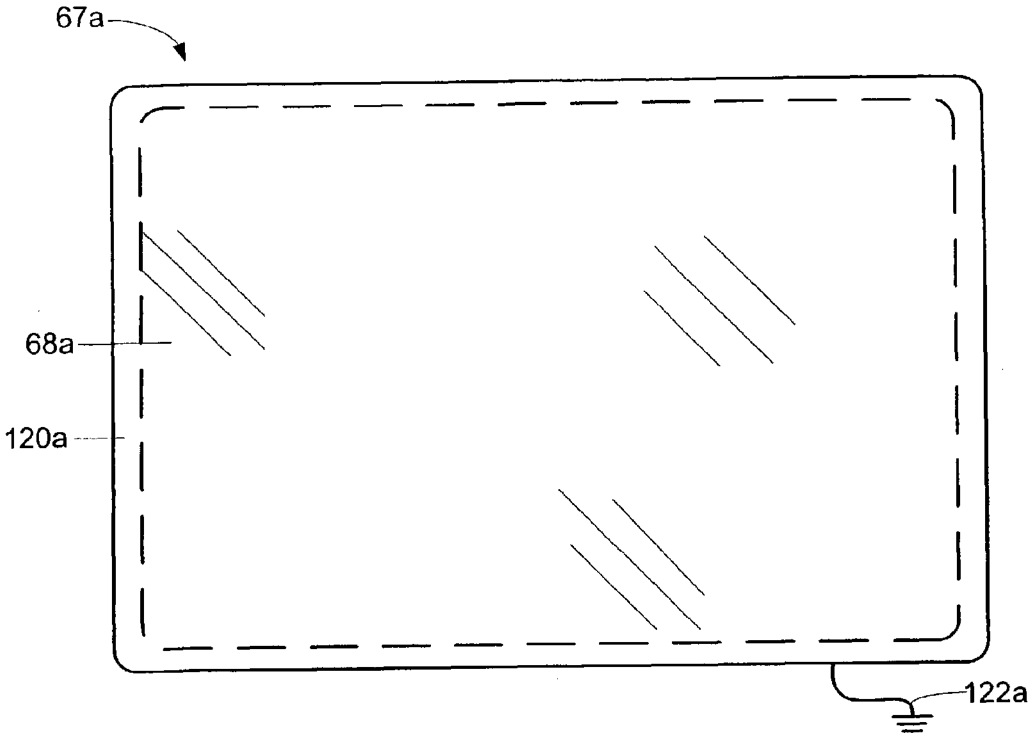
FIG. 4 illustrates a front view of an embodiment of a sputtered coating applied to a transparent film and a metallic grounding strip.
Figure 5:
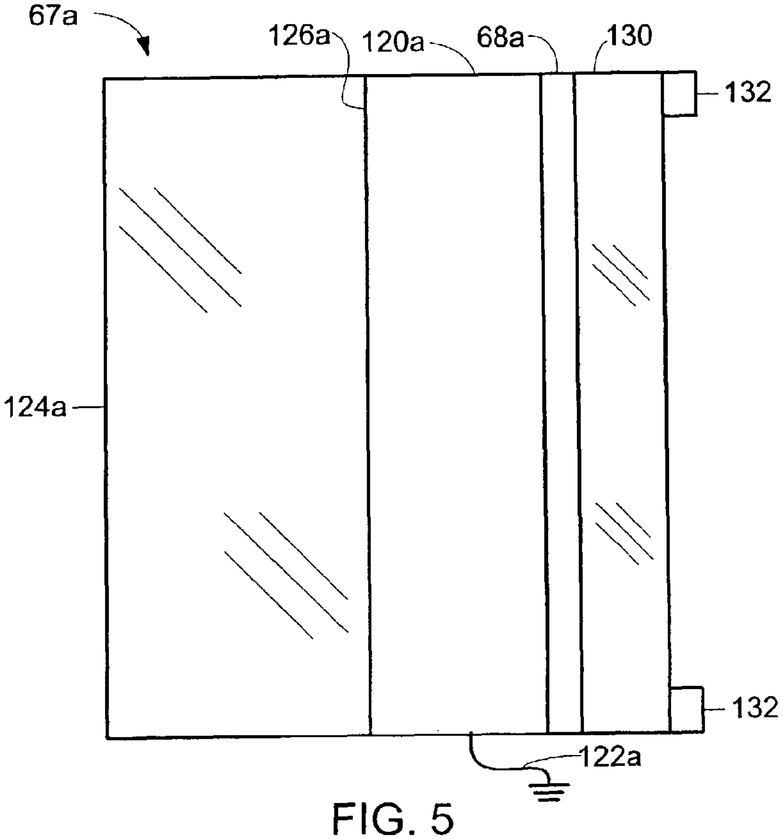
FIG. 5 illustrates a side view of an embodiment of a sputtered coating applied to a transparent film and a metallic grounding strip adjacent to a display panel.

FIG. 4 illustrates a front view of the transparent panel 67*a* that may be incorporated in the gaming unit 20, and FIG. 5 is a side view of the display panel 67*a*. Referring to FIGS. 4 and 5, the gaming unit 20 may include the transparent panel 67*a*, the conductive coating 68*a*, a metallic strip 120*a*, and a grounding cable 122*a*. The conductive coating 68*a* may be a sputtered coating that is applied to a substantially transparent, polyester film 130. The transparent, polyester film 130 and the conductive coating 68*a* may be mounted inside the housing 50 and next to the transparent panel 67*a* such that the conductive coating 68*a* is on the side of the transparent, polyester film 130 closest to the transparent panel 67*a*. Between the transparent panel 67*a* and the conductive coating 68*a* is the metallic strip 120*a*, which extends around the perimeters of the transparent panel 67*a* and the conductive coating 68*a*.

The conductive coating 68*a* in FIG. 4 may be a sputtered Indium Tin Oxide (ITO) coated transparent film product such as that produced by CP Films Inc. of Martinsville, Va. The conductive coating 68*a* may be a high visible light transmittance and a low electrical surface resistance. For example, the conductive coating 68*a* may have a surface resistance of 300 ohms/square and a transmittance of 85%. Placing the conductive coating 68*a* proximate to the transparent panel 67*a* allows a user to see components within the gaming unit 20, such as the slot machine reels 69 or any mechanically rotatable wheel (s), and also effectively reduces electromagnetic emissions and increases electromagnetic immunity through the transparent panel 67*a*.

Many other types of materials may be used for the conductive coating 68*a*, such as metals and metal oxides. For example, tin oxide, indium oxide, titanium, copper, silver, zirconium, and gold may be used. Each of these materials combines low surface resistance and high visible light transmission. The ability of thin, conductive coatings to attenuate the electromagnetic energy emitted by electronic devices depends on the surface resistance of the coatings. The shielding effectiveness of thin coatings, expressed in decibels (dB), can be calculated by the following formula: $SE=20\log[(7\times10^{11})/(f\times R)]$ where SE is the shielding effectiveness expressed in decibels (dB), f is the frequency of interest in hertz (Hz) and R is the surface resistance of the thin, conductive coating. Shielding providing more than 20 dB of attenuation throughout the frequency range usually encountered in electronic devices is considered ideal.

Still referring to FIG. 4, the metallic strip 120*a* may be a conductive wire mesh encasing a compressible foam gasket, such as Soft-Shield 5000 which is commercially available from Boyd Corporation in Modesto, Calif. The metallic strip may also be a copper tape or any other conductive material that, when properly grounded with the use of the grounding cable 122*a*, significantly enhances the attenuation and shielding effectiveness of the conductive coating 68*a*. While the metallic strip 120*a* is shown in FIG. 4 as extending around the entire perimeter of the conductive coating 68*a*, the metallic strip 120*a* may extend along only a portion of the perimeter of the conductive coating 68*a*.

Referring to FIG. 5, the transparent panel 67*a* has an external surface 124*a* and an internal surface 126*a*. The internal surface 126*a* faces the inside of the gaming unit 20 and is proximate the metallic strip 120*a*. Adjacent the metallic strip 120*a* is the conductive coating 68*a* which is applied to the transparent polyester film 130. A number of mounting brackets 132 may be used to apply pressure to the transparent polyester film 130 so that it remains adjacent to the transparent panel 67*a*.

Figure 6:
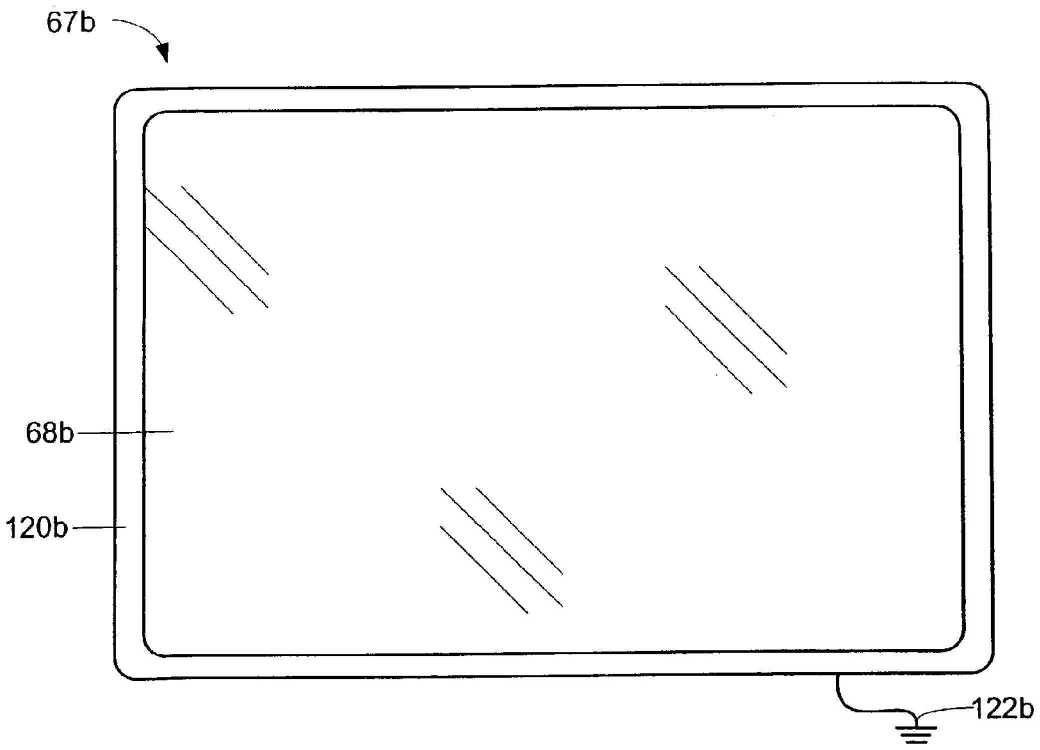
FIG. 6 illustrates a back view of an embodiment of a conductive coating applied to a transparent panel and a metallic grounding strip.

FIG. 6 illustrates a back view of a different embodiment of the transparent panel 67*b* with the conductive coating 68*b* applied directly to the inside surface of the transparent panel 67*b*. This is different from the embodiment shown in FIGS. 4 and 5, where the conductive coating 68*a* was applied to the transparent film 130. The conductive coating 68*b* may be applied to the inside surface of the transparent panel 67*b* using a wide variety of processes. For example, the conductive coating 68*b* may be applied using vacuum sputter deposition of a conductive material, where the conductive material may be one of many types of material that have a high transmittance and a low surface resistivity. Suitable materials may include many metals such as, for example, titanium, aluminum, copper, silver, zirconium, gold as well as many oxides such as, for example, tin oxide, indium tin oxide, silicone dioxide, etc.

Other techniques that may be used to apply the conductive coating 68*b* include dip coating, flexography, gravure, tinting, and screen printing. As with sputter deposition described above, many different material may be used in these techniques as well. The materials have in common a high transmittance and a low surface resistivity. Screen printing materials may be used with conventional printing equipment. Many different types of screen printing materials may be used which include transparent conductive ink or paste, opaque transparent ink or paste, and non-transparent ink or paste. The transparent conductive ink or paste may be applied to the inside surface of the transparent panel 67*b* to form a barrier to reduce radiated emissions and enhance radio frequency immunity (RFI).

The use of the opaque transparent ink or paste and the non-transparent ink or paste may be used to create graphic artwork on the transparent panel 67*b*. Multiple colors may be used to create graphic artwork having a plurality of colors. As with the transparent conductive ink, the opaque transparent ink or paste and the non-transparent ink or paste may be applied to the inside surface of the transparent panel 67*b* to form a barrier to reduce radiated emissions and enhance radio frequency immunity (RFI).

Figure 7:
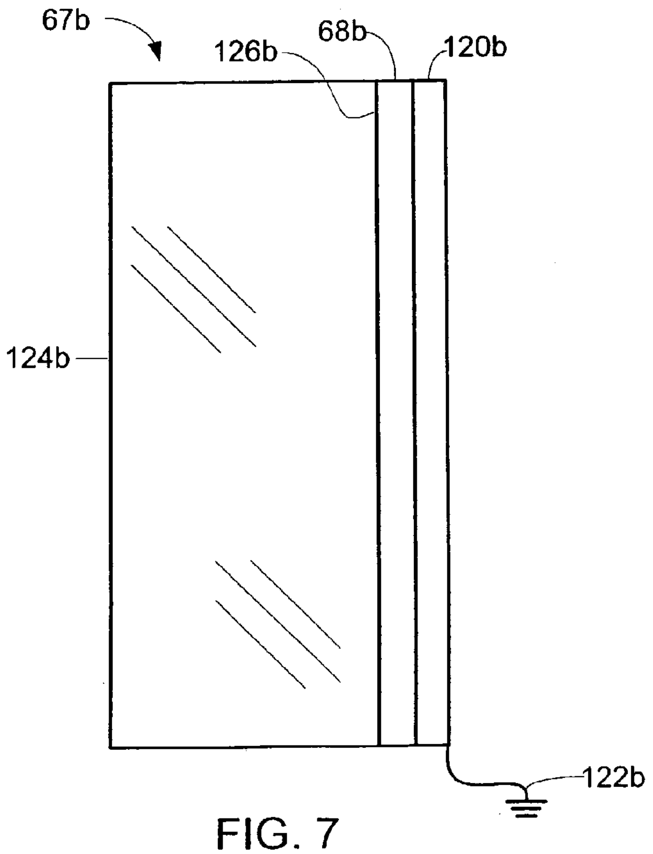
FIG. 7 illustrates a side view of an embodiment of a conductive coating applied to a transparent panel and a metallic grounding strip.

FIG. 7 is a side view of the embodiment from FIG. 6, illustrating the transparent panel 67*b* with the conductive coating 68*b* applied directly to the inside surface 126*b* of the transparent panel 67*b*. The metallic strip 120*b* is applied around the perimeter of the conductive coating 68*b* and grounded with the grounding cable 122*b*. The metallic strip 120*b* may also be located between the transparent panel 67*b* and the conductive coating 68*b*, as well as being reduced or eliminated, as long as the conductive coating 68*b* is properly grounded.

Figure 8:
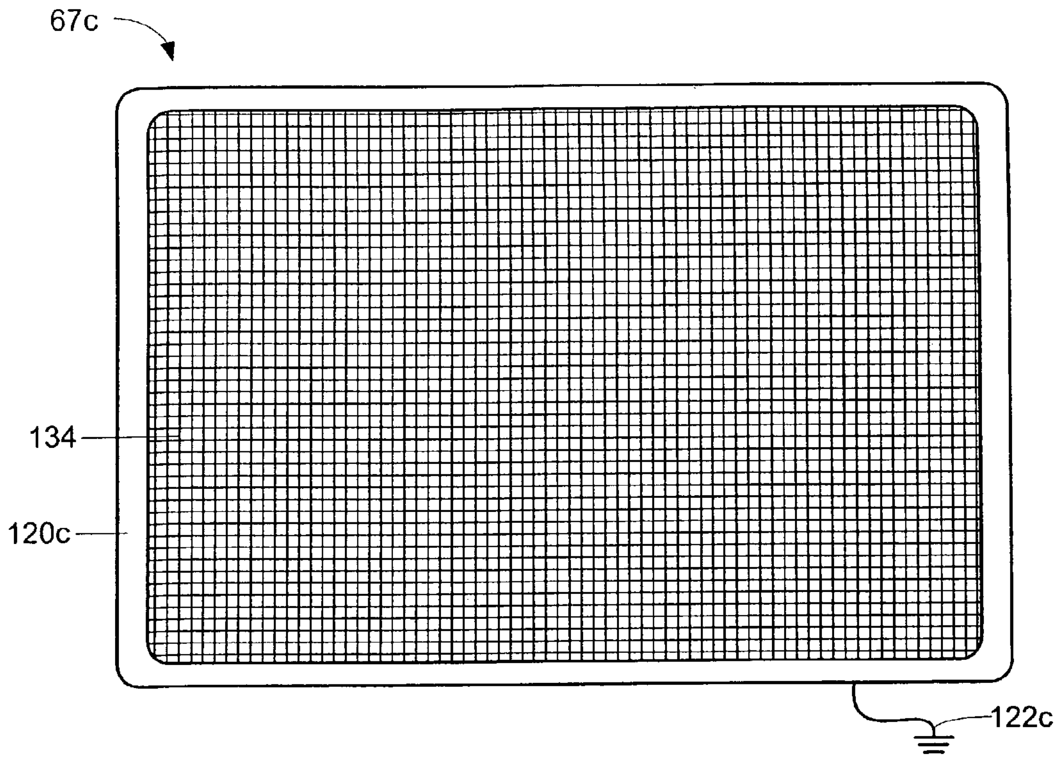
FIG. 8 illustrates a back view of an embodiment of a conductive screen proximate a transparent panel and a metallic grounding strip.

FIG. 8 illustrates a back view of a different embodiment of the transparent panel 67*c* with a conductive screen 134 located proximate the inside surface of the transparent panel 67*c*. The conductive screen 134 may be very fine and comprised of conductive wires having extremely small diameters. The conductive screen 134 may comprise any number of conductive material types having a low resistivity known to those of ordinary skill in the art. Suitable materials may include, for example, copper, silver, gold, etc.

The small gauge wires used to form the conductive screen 134 allows the conductive screen 134 to be substantially transparent to a player playing the gaming apparatus 20. A metallic strip 120*c* may be located around the perimeter of the conductive screen 134 and grounded with the grounding cable 122*c* to form a barrier to reduce radiated emissions and enhance radio frequency immunity (RFI).

Figure 9:
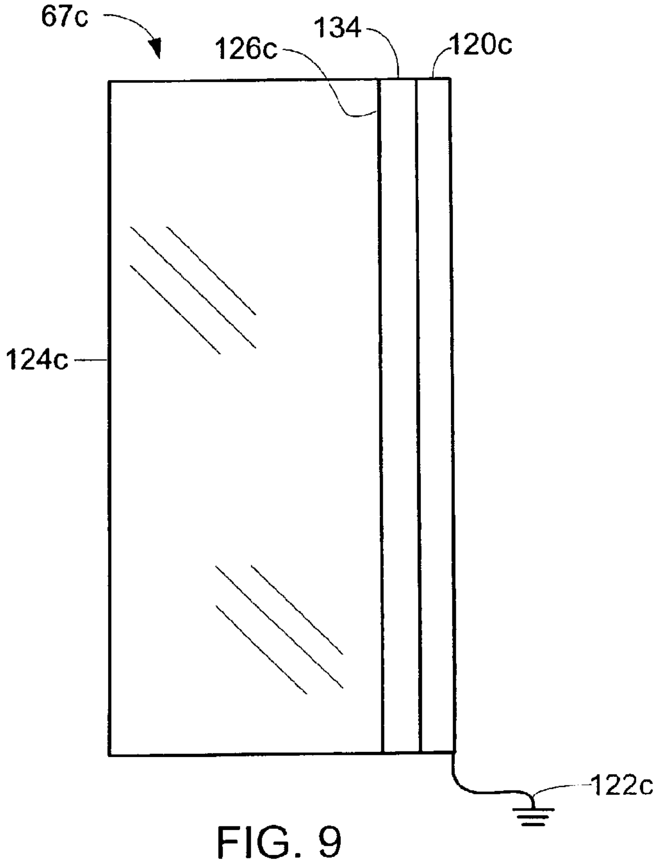
FIG. 9 illustrates a side view of an embodiment of a conductive screen proximate a transparent panel and a metallic grounding strip.

FIG. 9 is a side view of the embodiment from FIG. 8, illustrating the transparent panel 67*c* with the conductive screen 134 located proximate the inside surface 126*b* of the transparent panel 67*c*. The metallic strip 120*c* is applied around the perimeter of the conductive screen 134 and grounded with the grounding cable 122*c*. It should also be noted that the conductive screen 134 may sandwiched between the transparent panel 67*c* and another transparent panel (not shown). The metallic strip 120*c* may also be located between the transparent panel 67*c* and the conductive screen 134 as well as being eliminated completely, as long as the conductive screen 134 is properly grounded.

Figure 10:
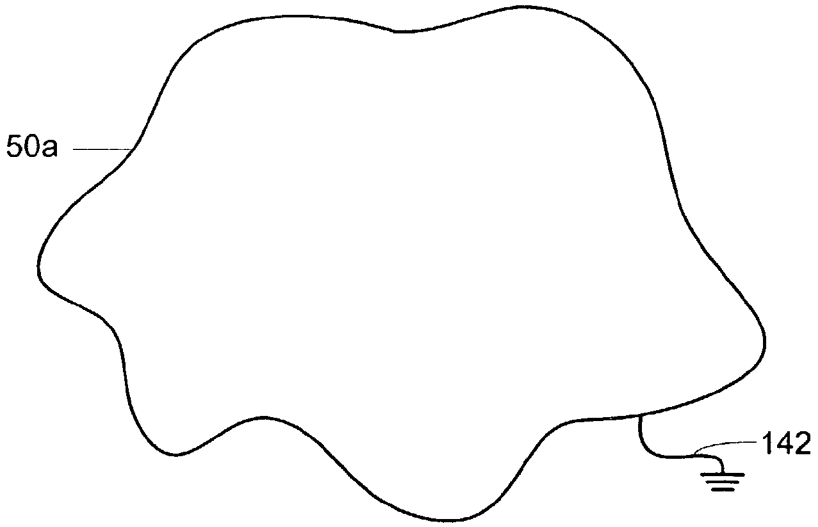
FIG. 10 illustrates a front view of an embodiment of a conductive coating applied to a portion of a housing and a metallic grounding strip.
Figure 11:
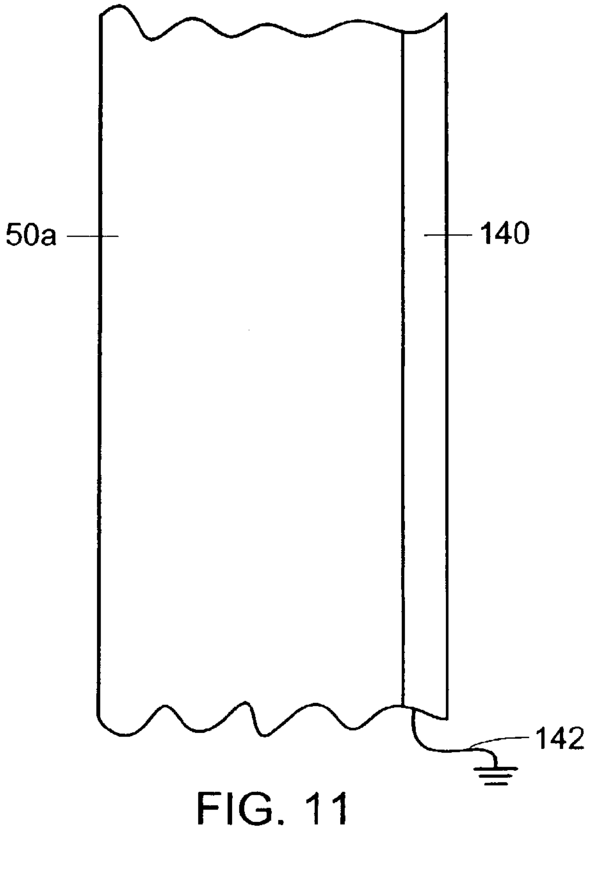
FIG. 11 illustrates a side view of an embodiment of a conductive coating applied to a portion of a housing and a metallic grounding strip.

FIGS. 10 and 11 illustrate yet another embodiment of a non-metallic housing portion 50*a* having a conductive coating 140 applied to a surface of the housing portion 50*a*. The housing portion 50*a* may be any part of the housing 50 from FIG. 2. The conductive coating 140 may be applied to the housing portion 50*a* to enhance its shielding effectiveness. Conventional gaming apparatuses often use housings made of metal for structural purposes as well as for the shielding provided by the metal. The conductive coating 140 allows other materials such as, for example, wood and plastic to be used and still maintain the ability to reduce emissions radiated from the gaming unit 20 and maintain RF immunity.

The ability to use plastic for portions of the housing 50 allows complex structures to be formed quickly and inexpensively using an extruded plastic technique, an injection molding technique, or any other technique known to those of ordinary skill in the art. The conductive coating may be applied using a variety of techniques, one of which includes spraying the material onto the housing portion 50*a* similar to a painting technique. The conductive coating 140 may have a low surface resistance and may be transparent or non-transparent. The shielding effectiveness of the coating may be further enhanced with the use of a grounding cable 142.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 12:
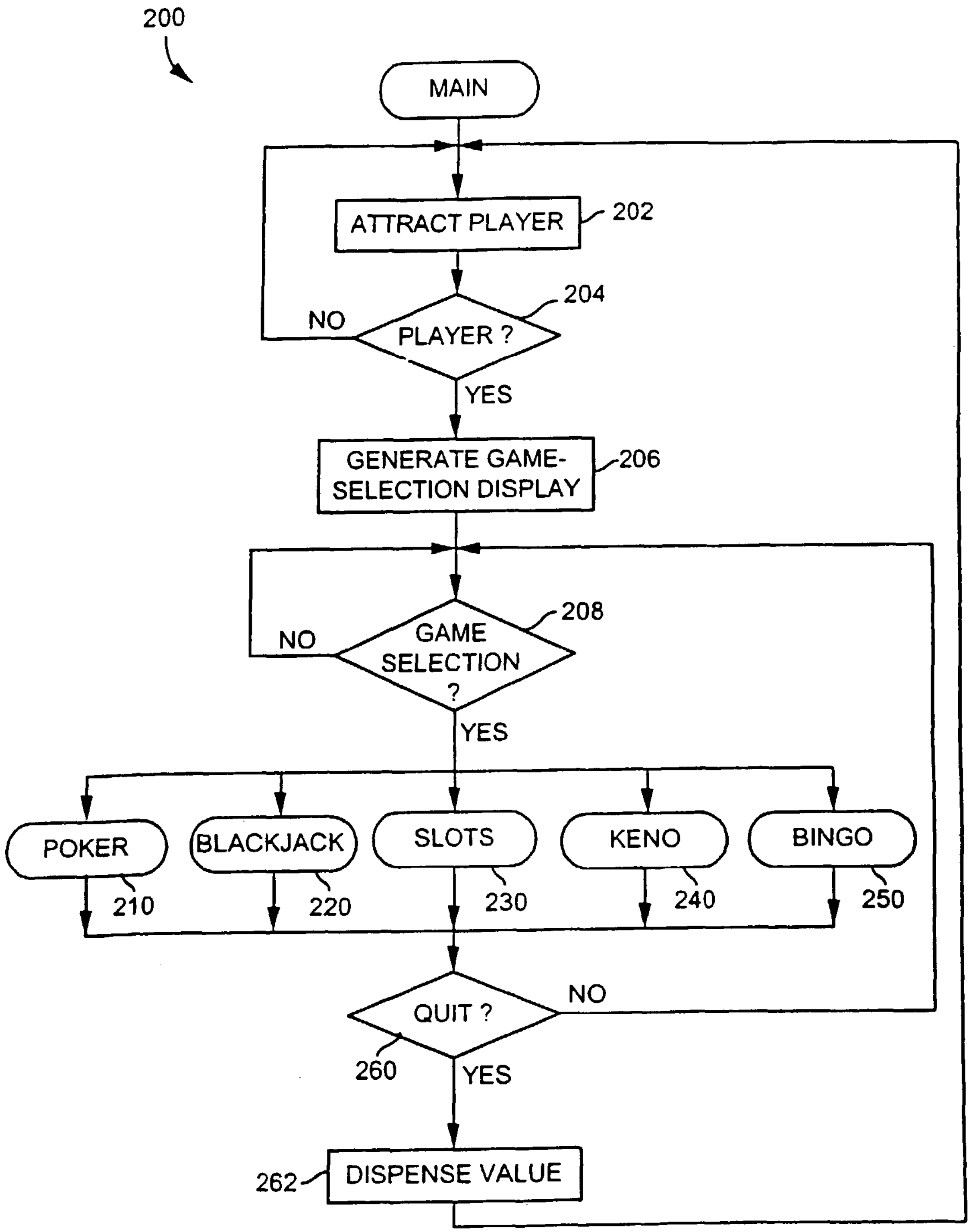
FIG. 12 is a flowchart of an embodiment of a main routine that may be performed during operation of one or more of the gaming units.

FIG. 12 is a flowchart of a main operating routine 200 that may be stored in the memory of the controller 100. Referring to FIG. 12, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 12, a different number of routines could be included to allow play of a different number of games. The gaming unit 20 may also be programmed to allow play of different games.

Figure 13:
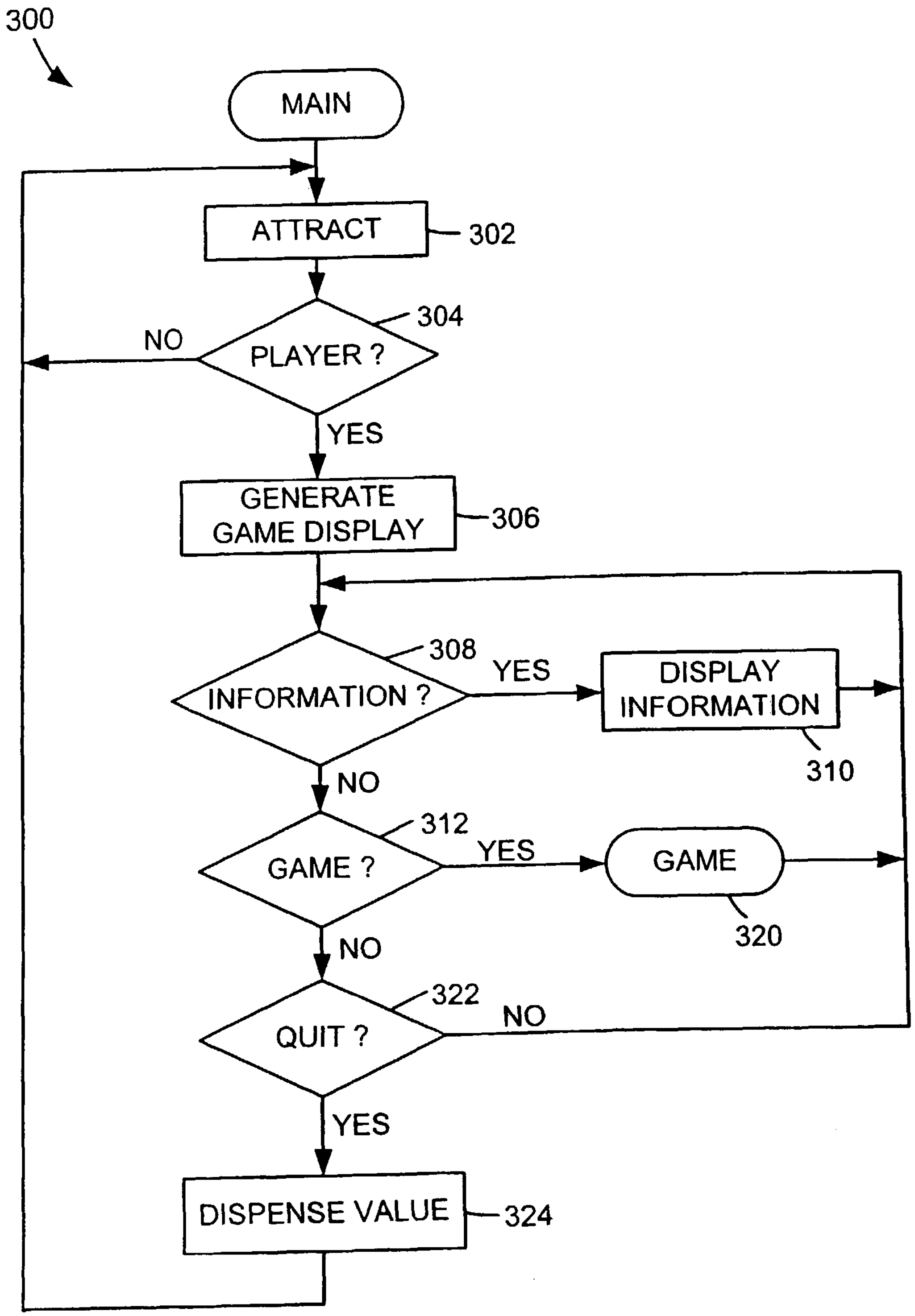
FIG. 13 is a flowchart of an alternative embodiment of a main routine that may be performed during operation of one or more of the gaming units.

FIG. 13 is a flowchart of an alternative main operating routine 300 that may be stored in the memory of the controller 100. The main routine 300 may be utilized for gaming units 20 that are designed to allow play of only a single game or single type of game. Referring to FIG. 13, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information maybe displayed at block 310. Block 312 may be used to determine if the player requested initiation of a game, in which case a game routine 320 may be performed. The game routine 320 could be any one of the game routines disclosed herein, such as one of the five game routines 210, 220, 230, 240. 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 14:
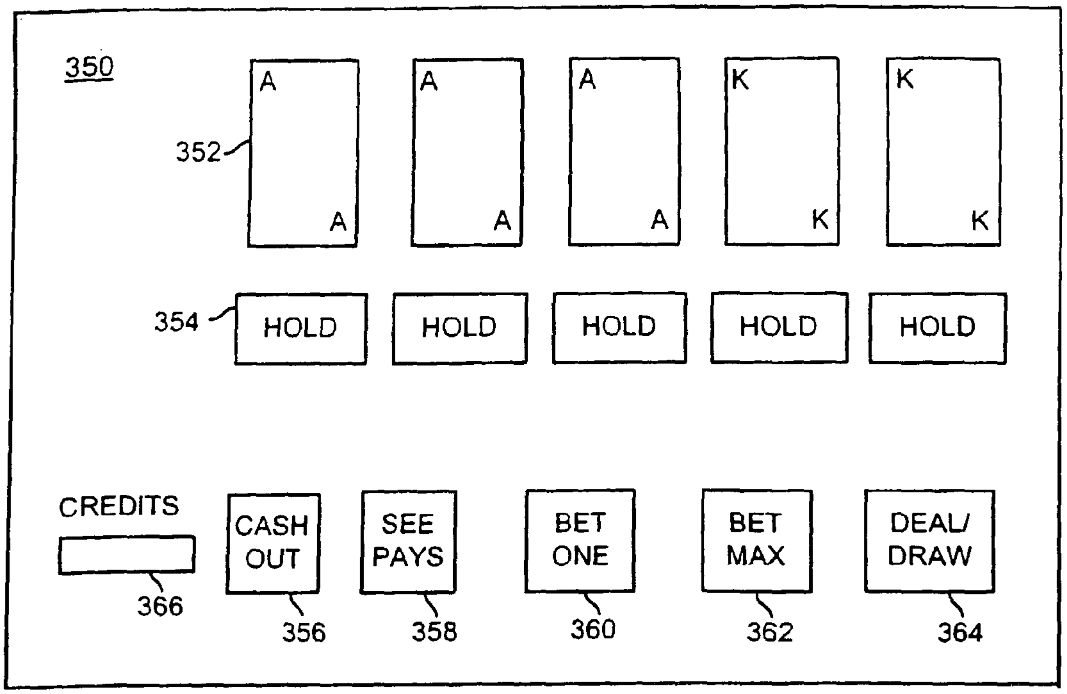
FIG. 14 is an illustration of an embodiment of a visual display that may be displayed during performance of the video poker routine of FIG. 16.

FIG. 14 is an exemplary display 350 that may be shown on the display unit 70 during performance of the video poker routine 210 shown schematically in FIG. 12. Referring to FIG. 14, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 16:
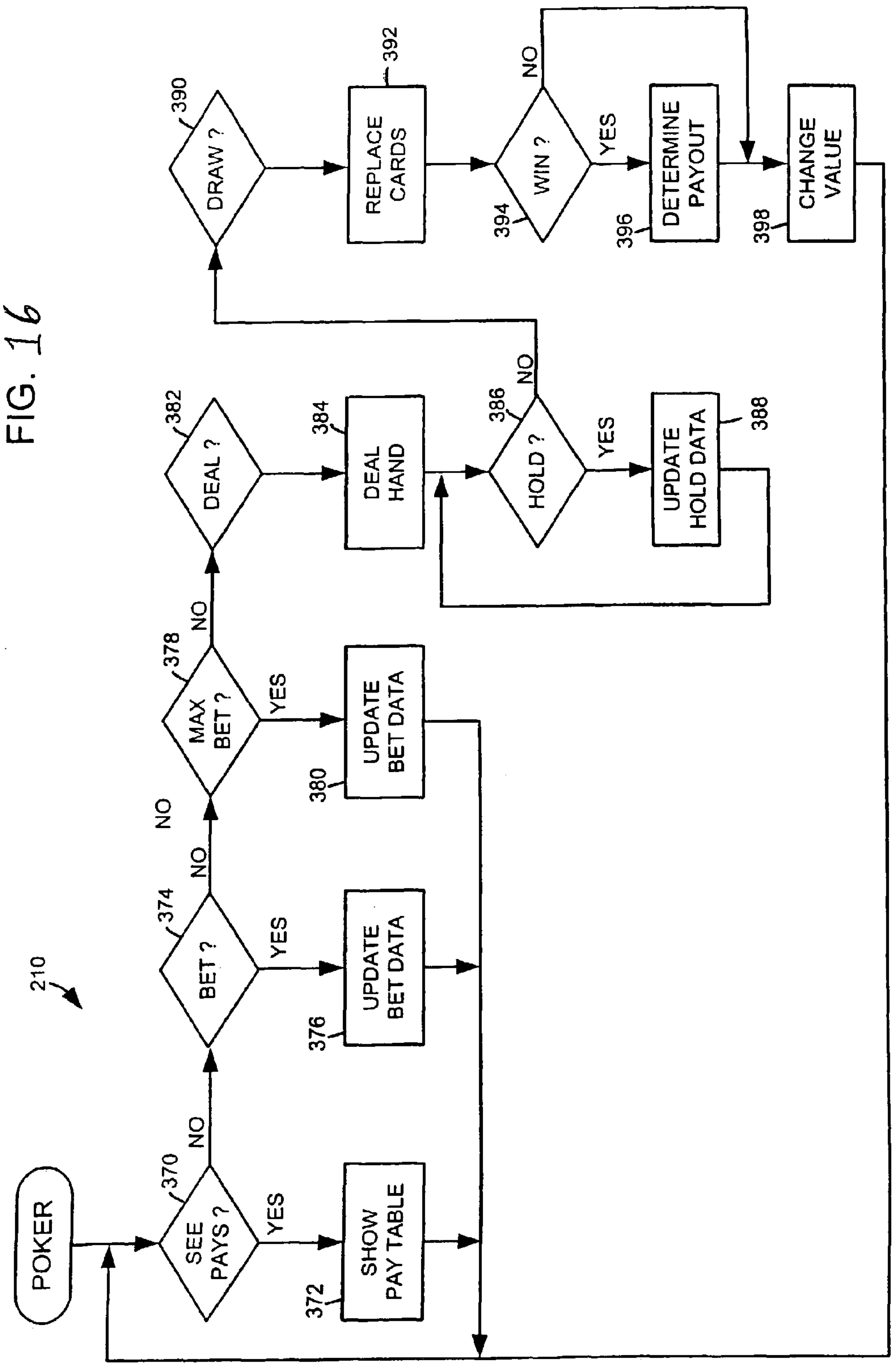
FIG. 16 is a flowchart of an embodiment of a video poker routine that may be performed by one or more of the gaming units.

FIG. 16 is a flowchart of the video poker routine 210 shown schematically in FIG. 12. Referring to FIG. 16, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 14).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 15:
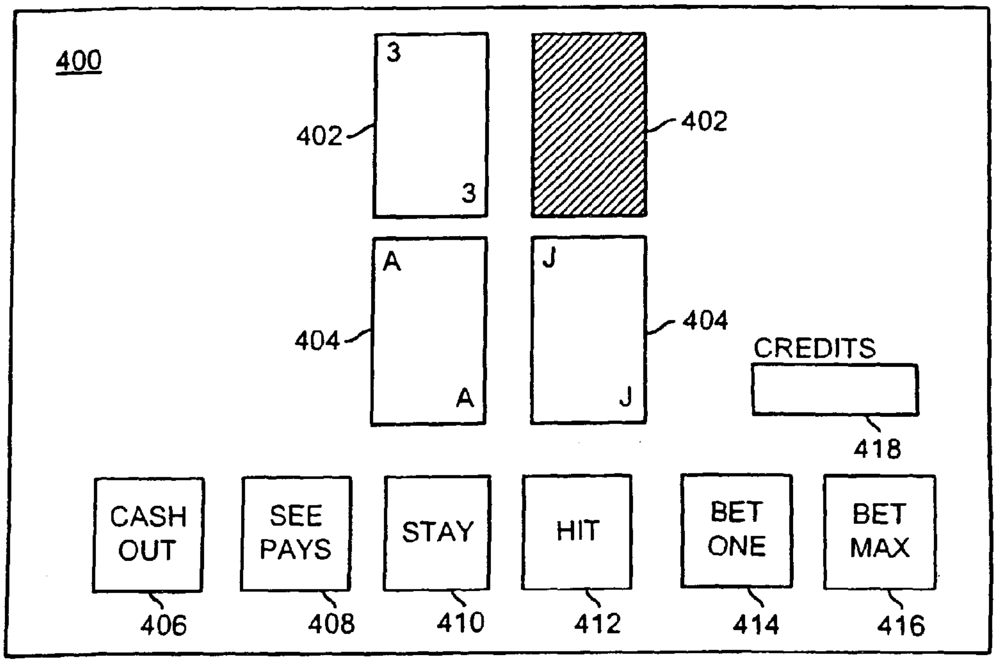
FIG. 15 is an illustration of an embodiment of a visual display that may be displayed during performance of the video blackjack routine of FIG. 17.

FIG. 15 is an exemplary display 400 that may be shown on the display unit 70 during performance of the video blackjack routine 220 shown schematically in FIG. 12. Referring to FIG. 15, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 17:
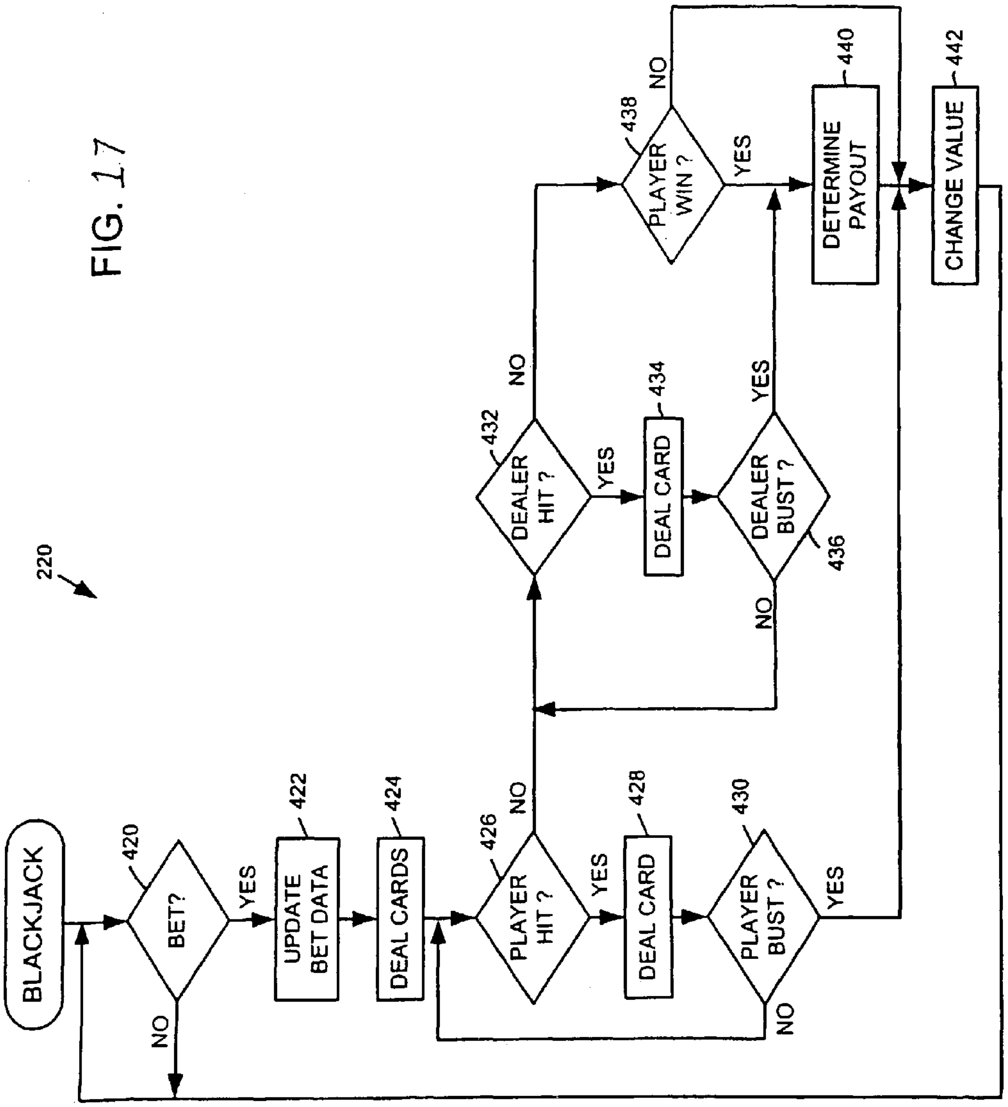
FIG. 17 is a flowchart of an embodiment of a video blackjack routine that may be performed by one or more of the gaming units.

FIG. 17 is a flowchart of the video blackjack routine 220 shown schematically in FIG. 12. Referring to FIG. 17, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 15).

Slots

FIG. 18 is an exemplary display 450 that may be shown on the display unit 70 during performance of the slots routine 230 shown schematically in FIG. 12. Referring to FIG. 18, the display 450 may include video images 452 of a plurality of slot machine reels, each of the reels having a plurality of reel symbols 454 associated therewith. Although the display 450 shows five reel images 452, each of which may have tree reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 20:
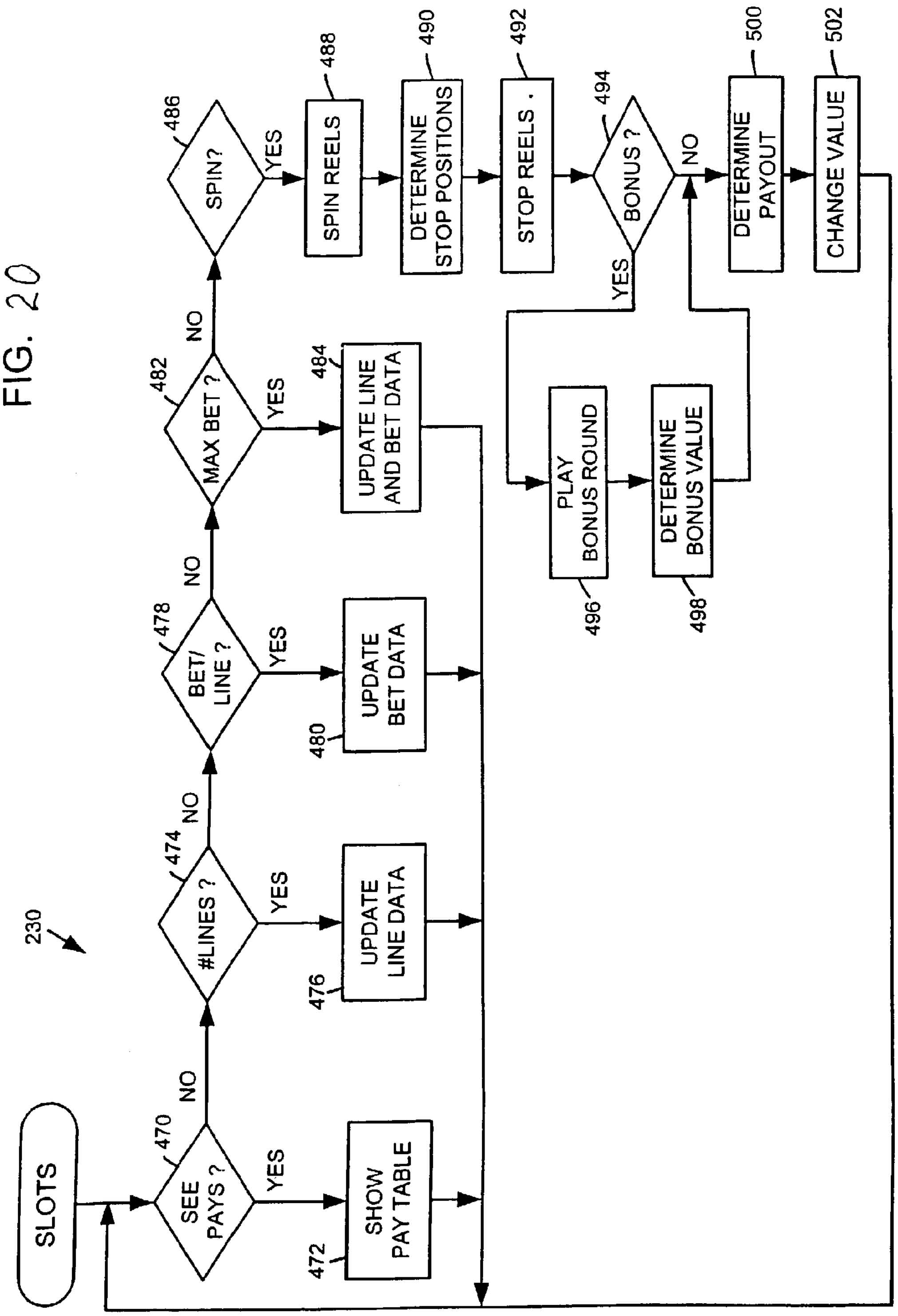
FIG. 20 is a flowchart of an embodiment of a slots routine that may be performed by one or more of the gaming units.

FIG. 20 is a flowchart of the slots routine 230 shown schematically in FIG. 18. Referring to FIG. 20, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 19 is an exemplary display 520 that may be shown on the display unit 70 during performance of the video keno routine 240 shown schematically in FIG. 12. Referring to FIG. 19, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 21:
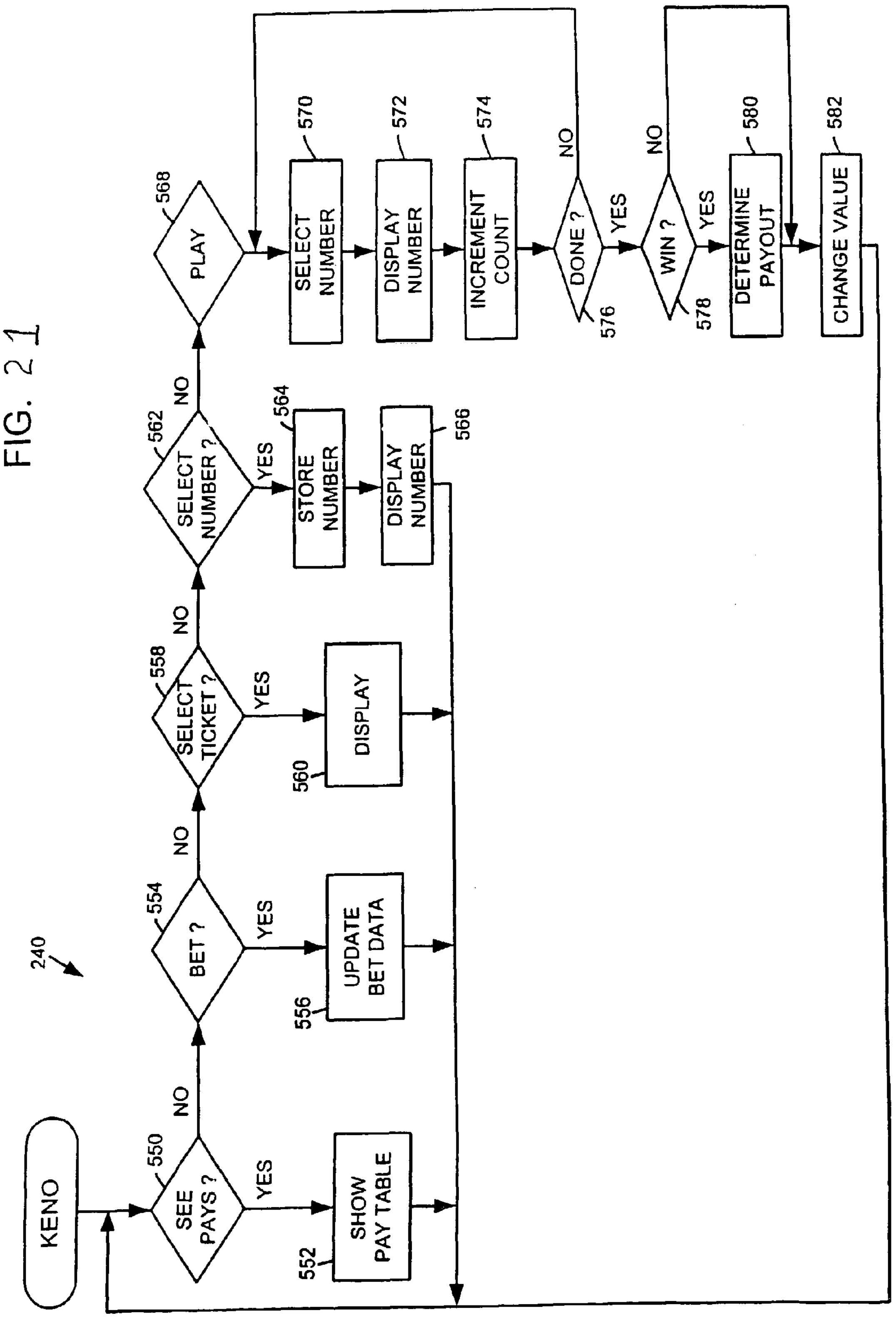
FIG. 21 is a flowchart of an embodiment of a video keno routine that may be performed by one or more of the gaming units.

FIG. 21 is a flowchart of the video keno routine 240 shown schematically in FIG. 12. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 21, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 19).

Video Bingo

Figure 22:
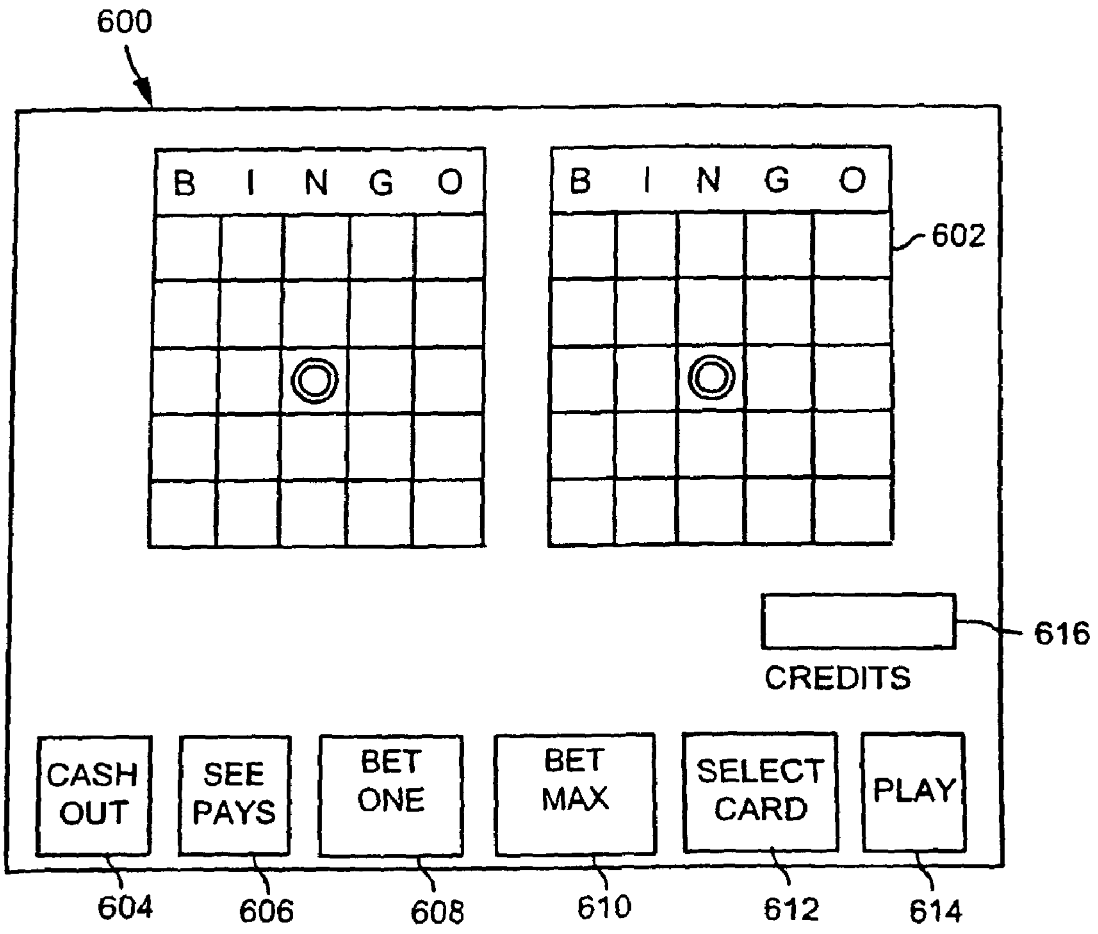
FIG. 22 is an illustration of an embodiment of a visual display that may be displayed during performance of the video bingo routine of FIG. 23.

FIG. 22 is an exemplary display 600 that may be shown on the display unit 70 during performance of the video bingo routine 250 shown schematically in FIG. 12. Referring to FIG. 22, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 23:
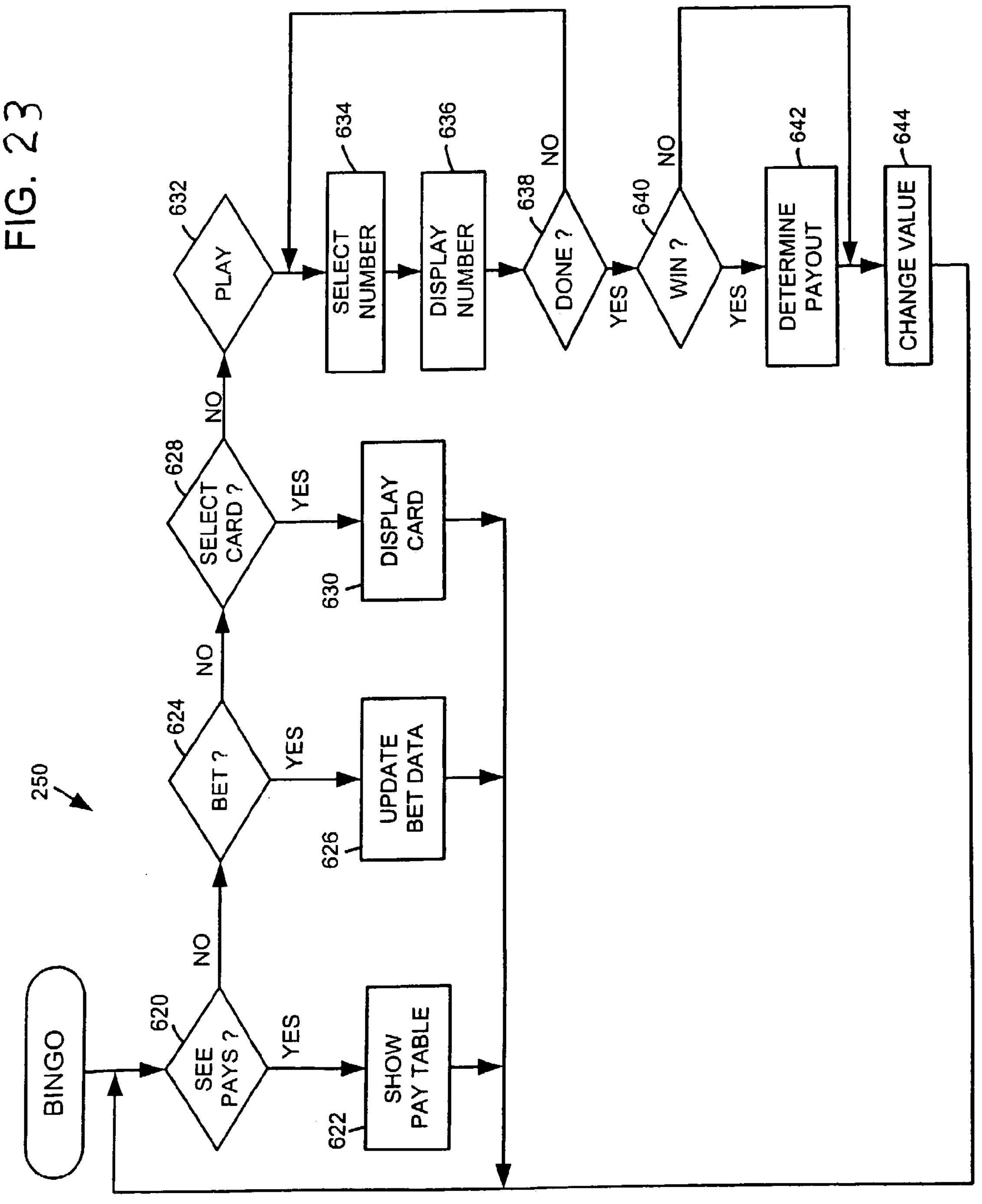
FIG. 23 is a flowchart of an embodiment of a video bingo routine that may be performed by one or more of the gaming units.

FIG. 23 is a flowchart of the video bingo routine 250 shown schematically in FIG. 12. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 23, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 22).

What is claimed is:

1. A gaming apparatus, comprising:

a housing;

a transparent panel associated with said housing, wherein said transparent panel comprises an outside surface and an inside surface;

a transparent film being disposed in said housing comprising a conductive coating;

said coating facing and being disposed proximate to said inside surface and disposed to effectively reduce electromagnetic emissions through said transparent panel while allowing viewing through said transparent panel, film and coating into said gaming apparatus, said coating comprising a metal oxide selected from the group of metal oxides consisting of tin oxide, indium tin oxide and indium oxide, said coating having a visible light transmittance of greater than 75% and a surface resistance less than three hundred ohms per square;

a metallic strip coupled to said coating and located at a perimeter of said coating, said metallic strip being electrically grounded;

a value input device;

a mechanically rotatable member disposed in said housing so that said mechanically rotatable member is visible to a player of said gaming apparatus through said transparent panel and said coating;

a controller operatively coupled to said mechanically rotatable member and said value input device, said controller comprising a processor and a memory operatively coupled to said processor, said controller being programmed to allow a person to make a wager, and said controller being programmed to determine a value payout associated with an outcome of a game incorporating said mechanically rotatable member.

2. A gaming apparatus as defined in claim 1, wherein said mechanically rotatable member is a slot reel.

3. A gaming apparatus as defined in claim 1 wherein said mechanically rotatable member is a wheel.

4. A gaming system comprising a plurality of gaming apparatuses as defined in claim 1, said gaming apparatuses being interconnected to form a network of gaming apparatuses.

5. A gaming apparatus, comprising:

a housing;

a transparent panel associated with said housing;

a conductive coating applied to said transparent panel to effectively reduce electromagnetic emissions through said transparent panel while allowing viewing through said transparent panel and coating into said gaming apparatus, said coating having a visible light transmittance of greater than 75% and a surface resistance less than three hundred ohms per square;

a metallic strip coupled to said coating and located at a perimeter of said coating, said metallic strip being electrically grounded;

a value input device;

a mechanically rotatable member disposed in said housing so that said mechanically rotatable member is visible to a player of said gaming apparatus through said transparent panel and said coating;

a controller operatively coupled to said mechanically rotatable member and said value input device, said controller comprising a processor and a memory operatively coupled to said processor, said controller being programmed to allow a person to make a wager, and said controller being programmed to determine a value payout associated with an outcome of a game incorporating said mechanically rotatable member.

6. A gaming apparatus as defined in claim 5, wherein said mechanically rotatable member is a slot reel.

7. A gaming apparatus as defined in claim 5, wherein said mechanically rotatable member is a wheel.

8. A gaming apparatus as defined in claim 5, wherein said coating is a sputtered coating comprising a metal oxide selected from the group of metal oxides consisting of tin oxide, indium tin oxide and indium oxide.

9. A gaming apparatus as defined in claim 5, wherein said coating is a sputtered coating comprising a transition metal selected from the group of transition metals consisting of titanium, copper, silver, zirconium and gold.

10. A gaming apparatus as defined in claim 5, wherein said coating is a conductive ink selected from the group of conductive inks consisting of transparent conductive ink and opaque transparent ink.

11. A gaming apparatus as defined in claim 5, wherein said coating is a metallic tint.

12. A gaming apparatus, comprising:

a display unit that is capable of generating video images, said display unit comprising a glass display panel, wherein said glass display panel comprises a first surface and a second surface;

a conductive coating being disposed on a transparent film adjacent to said second surface to effectively reduce electromagnetic emissions through said display panel while allowing viewing of said video images through said glass display panel and coating into said gaming apparatus, said coating having a visible light transmittance of greater than 75% and a surface resistance less than three hundred ohms per square;

a metallic strip coupled to said conductive coating and located proximate to said second surface at a perimeter of said conductive coating, said metallic strip being electrically grounded;

a value input device;

a controller operatively coupled to said display unit and said value input device, said controller comprising a processor and a memory operatively coupled to said processor, said controller being programmed to allow a person to make a wager, said controller being programmed to cause a video image representing a game to be generated on said display unit, said video image representing one of the following games: video poker, video blackjack, video slots, video keno or video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo, and said controller being programmed to determine a value payout associated with an outcome of said game.

13. A gaming apparatus as defined in claim 12, wherein said coating is a sputtered coating comprising a metal oxide selected from the group of metal oxides consisting of tin oxide, indium tin oxide and indium oxide.

14. A gaming apparatus as defined in claim 12, wherein said coating is a sputtered coating comprising a transition metal selected from the group of transition metals consisting of titanium, copper, silver, zirconium and gold.

15. A gaming apparatus as defined in claim 12, wherein said coating is a conductive ink selected from the group of conductive inks consisting of transparent conductive ink and opaque transparent ink.

16. A gaming apparatus as defined in claim 12, wherein said coating is a metallic tint.

17. A gaming apparatus, comprising:

a housing;

a transparent panel associated with said housing, wherein said transparent panel comprises a first surface and a second surface;

a conductive screen being electrically grounded and disposed proximate to said second surface to effectively reduce electromagnetic emissions through said transparent panel while allowing viewing through said transparent panel and conductive screen into said gaming apparatus, said screen having a visible light transmittance of greater than 75%;

a value input device;

a mechanically rotatable reel disposed in said housing so that said mechanically rotatable reel is visible to a player of said gaming apparatus through said transparent panel and said screen;

a controller operatively coupled to said mechanically rotatable reel and said value input device, said controller comprising a processor and a memory operatively coupled to said processor, said controller being programmed to allow a person to make a wager, and said controller being programmed to determine a value payout associated with an outcome of a game incorporating said mechanically rotatable reel.

18. A gaming apparatus as defined in claim 17 comprising a metallic strip coupled to said screen and located at a perimeter of said screen, said metallic strip being electrically grounded.

19. A gaming apparatus as defined in claim 18, wherein said metallic strip is located around substantially all of said perimeter.

20. A gaming system comprising a plurality of gaming apparatuses as defined in claim 17, said gaming apparatuses being interconnected to form a network of gaming apparatuses.

* * * * *